US012169863B2

(12) United States Patent
McBrady et al.

(10) Patent No.: US 12,169,863 B2
(45) Date of Patent: *Dec. 17, 2024

(54) AUTOMATIC ORDERING METHOD (71) Applicant: Honeywell International Inc., Charlotte, NC (US)

(72) Inventors: Adam Dewey McBrady, Morris Plains, NJ (US); Teresa Marta, Morris Plains, NJ (US); Stephan Bork, Morris Plains, NJ (US); Tong Shang, Morris Plains, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,073

(22) Filed: Nov. 22, 2023

(65) Prior Publication Data

US 2024/0086995 A1 Mar. 14, 2024

Related U.S. Application Data

(63) Continuation of application No. 16/967,019, filed as application No. PCT/US2018/016951 on Feb. 6, 2018, now Pat. No. 11,869,066.

(51) Int. Cl.
*G06Q 30/00* (2023.01)
*G01G 19/414* (2006.01)
(Continued)

(52) U.S. Cl.
CPC ....... *G06Q 30/0635* (2013.01); *G01G 19/414* (2013.01); *G06Q 10/087* (2013.01)

(58) Field of Classification Search
USPC ..................................................... 705/26.81
See application file for complete search history.

(56) References Cited

U.S. PATENT DOCUMENTS 10,909,610 B1    2/2021  Kramer et al.
11,126,955 B1 *  9/2021  Watson .............. G06Q 30/0633
(Continued)

FOREIGN PATENT DOCUMENTS

CN   105920927 A    9/2016
WO   2009/147478 A1  12/2009
WO   2015/077637 A1  5/2015

OTHER PUBLICATIONS

Metzger, C., Meyer, J., Fleisch, E., Roster, G., Weight-Sensitive Foam to Monitor Product Availability on Retail Shelves, 2007, International Conference on Pervasive Computing, Pervasive 2007, vol. 4480, pp. 268-279. (Year: 2007).*

(Continued)

*Primary Examiner* — Jeffrey A. Smith
*Assistant Examiner* — Brittany E Bargeon
(74) *Attorney, Agent, or Firm* — Alston & Bird LLP (57) ABSTRACT

Apparatus and associated methods relate to an automatic ordering method including a network-connected machine-readable code scanner identifying a product, and a network-connected weigh scale identifying a current weight of the product, the method further triggering an automatic order process when the current weight crosses a predetermined threshold. In an illustrative example, the automatic order process may send a signal to a user's network-connected personal device containing a notification that the product's current weight has crossed the predetermined threshold. The user may be presented one or more options, for example, regarding product purchase. In some examples, user setup selections may provide input to a function that determines the predetermined weight threshold. Various examples may include a network server. Online merchants providing online ordering of the product may also connect to the network server, for example. Various automatic ordering methods
(Continued)

may advantageously facilitate and/or promote just-in-time delivery of consumable products.

7 Claims, 9 Drawing Sheets

(51) Int. Cl.
  *G06Q 10/087* (2023.01)
  *G06Q 30/0601* (2023.01)

(56) References Cited

U.S. PATENT DOCUMENTS

| | | | |
|---|---|---|---|
| 11,869,066 | B2 | 1/2024 | McBrady et al. |
| 2007/0272081 | A1* | 11/2007 | Johansson .............. B01D 46/10 96/417 |
| 2007/0272083 | A1 | 11/2007 | Hoge et al. |
| 2008/0030320 | A1 | 2/2008 | Wilcox et al. |
| 2011/0064612 | A1 | 3/2011 | Franzoni et al. |
| 2012/0150677 | A1 | 6/2012 | Shuster |
| 2014/0229343 | A1 | 8/2014 | Higgins et al. |
| 2015/0149298 | A1 | 5/2015 | Tapley |
| 2015/0178654 | A1 | 6/2015 | Glasgow et al. |
| 2015/0324881 | A1* | 11/2015 | Ouimet .................. G06Q 30/06 705/14.49 |
| 2015/0379463 | A1 | 12/2015 | Sarangi |
| 2017/0249049 | A1* | 8/2017 | Wang .................... G06F 3/0412 |
| 2017/0300984 | A1 | 10/2017 | Hurwich |
| 2018/0322449 | A1 | 11/2018 | Schiller |

OTHER PUBLICATIONS

U.S. Appl. No. 16/967,019, filed Aug. 3, 2020, U.S. Pat. No. 11,869,066, Patented.
Advisory Action (PTOL-303) Mailed on Feb. 28, 2023 for U.S. Appl. No. 16/967,019.
Examiner Interview Summary Record (PTOL-413) Mailed on Feb. 28, 2023 for U.S. Appl. No. 16/967,019.
Final Rejection Mailed on Dec. 7, 2022 for U.S. Appl. No. 16/967,019.
International Search Report of the International Searching Authority for PCT/US2018/016951 with mailing date of May 7, 2018.
IPEA/409—International Preliminary Report on Patentability Mailed on Aug. 11, 2020 for WO Application No. PCT/US18/016951, 6 page(s).
Metzger, C., Meyer, J., Fleisch, E., Troster, G., Weight-Sensitive Foam to Monitor Product Availability on Retail Shelves, 2007, International Conference on Pervasive Computing, Pervasive 2007, vol. 4480, pp. 268-279. (Year: 2007).
Non-Final Rejection Mailed on Aug. 16, 2022 for U.S. Appl. No. 16/967,019.
Non-Final Rejection Mailed on Mar. 15, 2023 for U.S. Appl. No. 16/967,019, 13 page(s).
Notice of Allowance and Fees Due (PTOL-85) Mailed on Aug. 24, 2023 for U.S. Appl. No. 16/967,019, 10 page(s).
Office Action Appendix Mailed on Feb. 28, 2023 for U.S. Appl. No. 16/967,019.
Outgoing Written Opinion of the ISA Mailed on May 7, 2018 for WO Application No. PCT/US18/016951.

* cited by examiner

AUTOMATIC ORDERING METHOD

CROSS-REFERENCE TO RELATED APPLICATIONS

This application is a continuation of and claims priority to U.S. application Ser. No. 16/967,019, entitled "AUTOMATIC ORDERING APPARATUS" and filed Aug. 3, 2020, which is a national stage entry of PCT/US2018/016951 filed Feb. 6, 2018, each of which is incorporated herein by reference in its entirety.

TECHNICAL FIELD

Various embodiments relate generally to computerized scales.

BACKGROUND

Household items that are purchased, used up and repurchased are often referred to as consumables. Consumers may procure and consume such products on a regular basis. Some consumers may create manual shopping lists and may refer to the lists as they shop at nearby stores to replenish their consumables. Some consumers may shop online and have the consumables shipped to their homes. Some consumers may set up systematic reordering with one or more merchants to systematically receive consumables on a regular basis.

Just-in-time delivery is an inventory restocking principle used by various manufacturing companies. These companies receive parts and raw materials used in the manufacturing process near the time they will be needed in production, to minimize inventory at the factory. Minimizing inventory may recover valuable floor space. Minimizing inventory may also reduce waste.

SUMMARY

Apparatus and associated methods relate to an automatic ordering method including a network-connected machine-readable code scanner identifying a product, and a network-connected weigh scale identifying a current weight of the product, the method further triggering an automatic order process when the current weight crosses a predetermined threshold. In an illustrative example, the automatic order process may send a signal to a user's network-connected personal device containing a notification that the product's current weight has crossed the predetermined threshold. The user may be presented one or more options, for example, regarding product purchase. In some examples, user setup selections may provide input to a function that determines the predetermined weight threshold. Various examples may include a network server. Online merchants providing online ordering of the product may also connect to the network server, for example. Various automatic ordering methods may advantageously facilitate and/or promote just-in-time delivery of consumable products.

Various embodiments may achieve one or more advantages. For example, some embodiments may automatically retrieve a product weight via a merchant server on a network. Some embodiments may mitigate unplanned depletion of consumable products. Some examples may free up valuable floor space or storage space. Product manufacturers may benefit from customer brand loyalty. Service providers such as hotels and restaurants may spend less time and effort taking inventory and reordering consumable supplies. Consumers may find convenience in the automatic scanning feature and in doorstep delivery of specific supplies that are nearing depletion. Some customers may find convenience in using their mobile devices as part of the reordering system.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, exemplary use cases with various products, suspension arrangements and scanning methods are briefly introduced with reference to FIGS. 1, 2 and 3. Second, with reference to FIG. 4, the discussion turns to an exemplary embodiment that illustrates a weigh scale incorporated into the product packaging. Next, with reference to FIG. 5, an example of increasing product weight is presented. Specifically, as a filter is filled with particulate matter, an increase in weight, or an increase in the force to move a medium (e.g., air, water) through the filter may be detected. Next, with reference to FIG. 6, an exemplary block diagram is presented. Finally, with reference to FIGS. 7, 8 and 9, exemplary process flows are presented.

Figure 1:
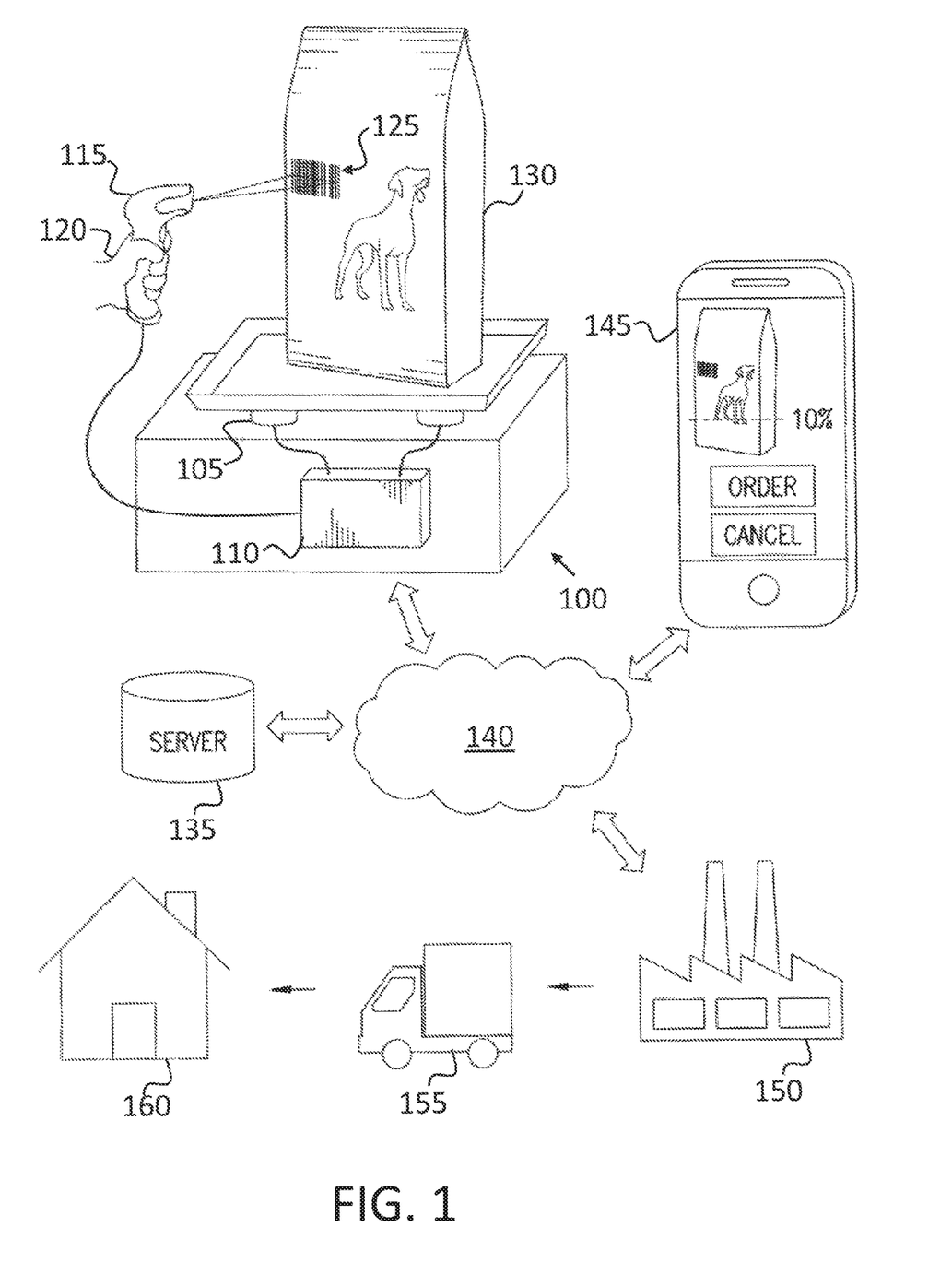
FIG. 1 depicts an exemplary network-connected scale with a tethered machine-readable code scanner, the scale continuously monitoring a product weight to trigger a reorder event in response to the product dropping below a predetermined weight threshold.

FIG. 1 depicts an exemplary network-connected scale with a tethered machine-readable code scanner, the scale continuously monitoring a product weight to trigger a reorder event in response to the product dropping below a predetermined weight threshold. An Internet connected weigh scale 100 includes a force sensor 105. The force sensor 105 is operatively coupled to a processor 110. The processor 110 is operatively coupled to an image scanner 115. A user 120 holding the image scanner 115 scans a barcode 125. The barcode 125 identifies a product 130. A dynamic weight of the product 130 is continuously monitored by the processor 110. For example, the weight of the product 130 (e.g., a bag of dog food) may decrease as the user 120 scoops food out of the bag. In response to the weight of the product 130 falling below a predetermined threshold, the processor 110 sends a reordering signal to a server 135 via a network 140. Accordingly, the server 135 sends an alert signal to a user's computing device 145 (e.g., mobile phone, mobile device, tablet, laptop computer, desktop computer), via, for example, the network 140.

The user's computing device 145 displays the alert coupled with a query for user action. For example, the alert may depict the product 130 sitting on the Internet connected weigh scale 100. The alert may display the reached threshold that triggered the alert. The query coupled with the alert may display one or more user choices. For example, the user 120 may be allowed to cancel the alert, ignore the alert, request a reminder at a later time, or to reorder the product 130.

When the user 120 chooses to reorder the product 130, the user's computing device 145 sends a purchase request signal to a vendor 150. The vendor 150 processes the purchase request and initiates a shipment 155. A delivery address 160 receives the shipment 155.

In some examples, the image scanner 115 may be a wireless device, which may advantageously mitigate cord snags. In some examples, the image scanner 115 may be a personal mobile device, which may advantageously provide user convenience. In various embodiments, the image scanner 115 may be incorporated into the Internet connected weigh scale 100, which may mitigate user frustration when searching for a wireless scanning device. The image scanner 115 may capture product identifying information associated with a product container. The product container may contain the product 130.

Various embodiments may include a user interface on the Internet connected weigh scale. The user interface may be connected to the processor 110, which may be connected to the network 140. Accordingly, the user interface may provide the user a method to reorder the product 130 without using a mobile computing device (e.g., 145).

Figure 2:
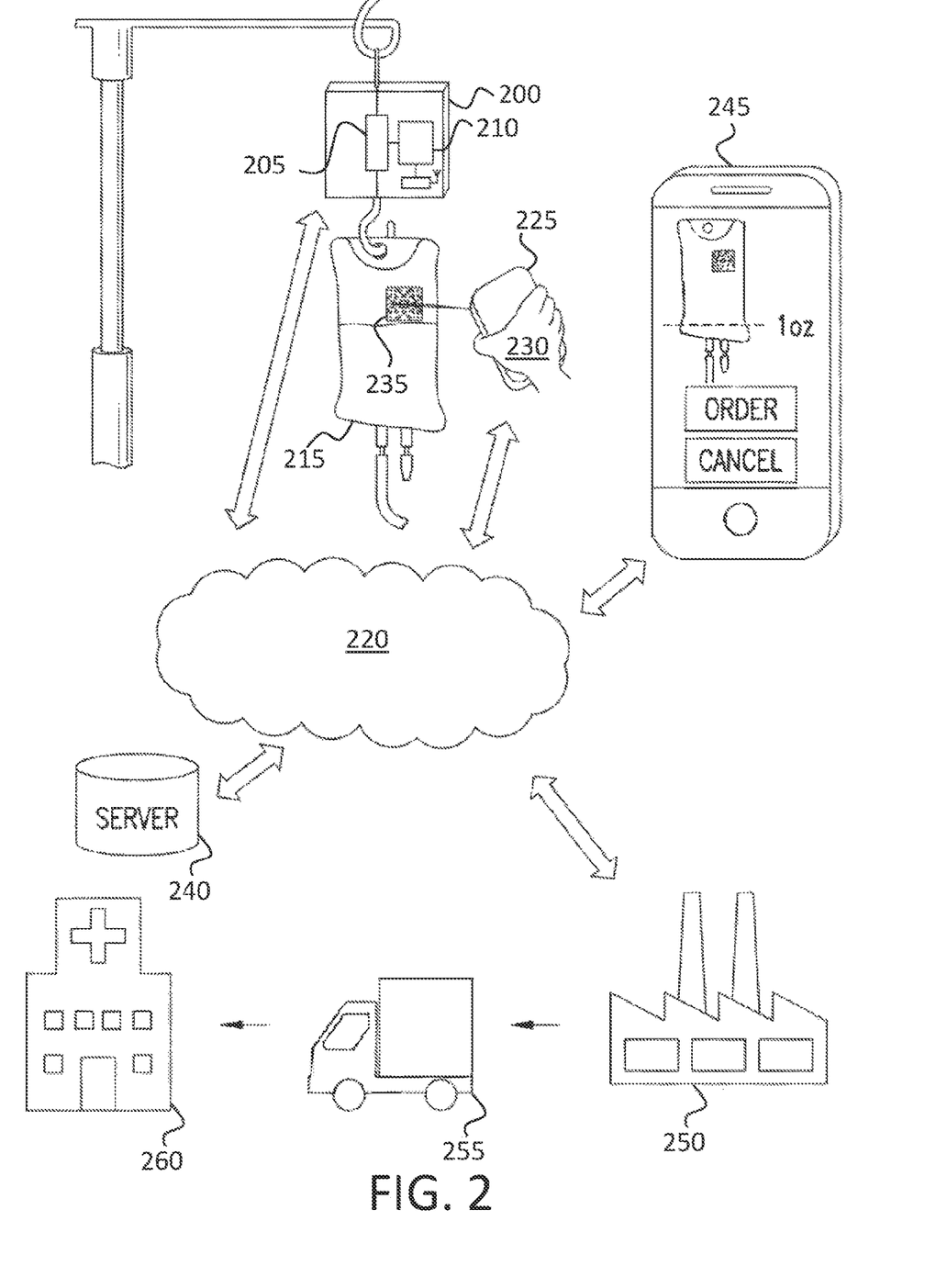
FIG. 2 depicts an exemplary network-connected scale monitoring the weight of a vertically suspended consumable product, the product being scanned by a hand-held mobile device.

FIG. 2 depicts an exemplary network-connected scale monitoring the weight of a vertically suspended consumable product, the product being scanned by a hand-held mobile device. A network-connected weigh scale 200 includes a force sensor 205. The force sensor 205 is operatively coupled to a processor 210. The force sensor 205 sends a signal containing the weight of a product 215 to the processor 210. The processor 210 is operably coupled to a network 220 (e.g., Internet, cellular, wireless medical telemetry system (WMTS)). A wireless device 225 is operably coupled to the network 220. A user 230 scans a barcode 235 with the wireless device 225. A scanned value encoded on the barcode 235 identifies the product 215. The wireless device 225 sends a signal containing the scanned value to the network 220. A server 240 receives a signal containing the scanned value from the network 220. In various examples, the wireless device 225 may be operably coupled to the network-connected weigh scale 200. The wireless device 225 may capture product identifying information associated with a product container. The product container may contain the product 215.

A dynamic weight of the product 215 may be continuously monitored by the processor 210. In response to the weight of the product 215 falling below a predetermined threshold, the processor 210 sends a reordering signal to the server 240 via the network 220. Accordingly, the server 240 sends an alert signal to a user's computing device 245 (e.g., mobile phone, tablet, laptop computer, desktop computer). In some examples, the wireless device 225 may be the same device as the user's computing device 245.

The user's computing device 245 displays the alert coupled with a query for user action. For example, the alert may depict the product 215 hanging on the network-connected weigh scale 200. The alert may display the reached threshold that triggered the alert. The query coupled with the alert may display one or more user choices. In response to the user 230 choosing to reorder the product 215, the user's computing device 245 sends a purchase request signal to a vendor 250. The vendor 250 processes the purchase request, and initiates a shipment 255. A delivery address 260 receives the shipment 255.

Figure 3:
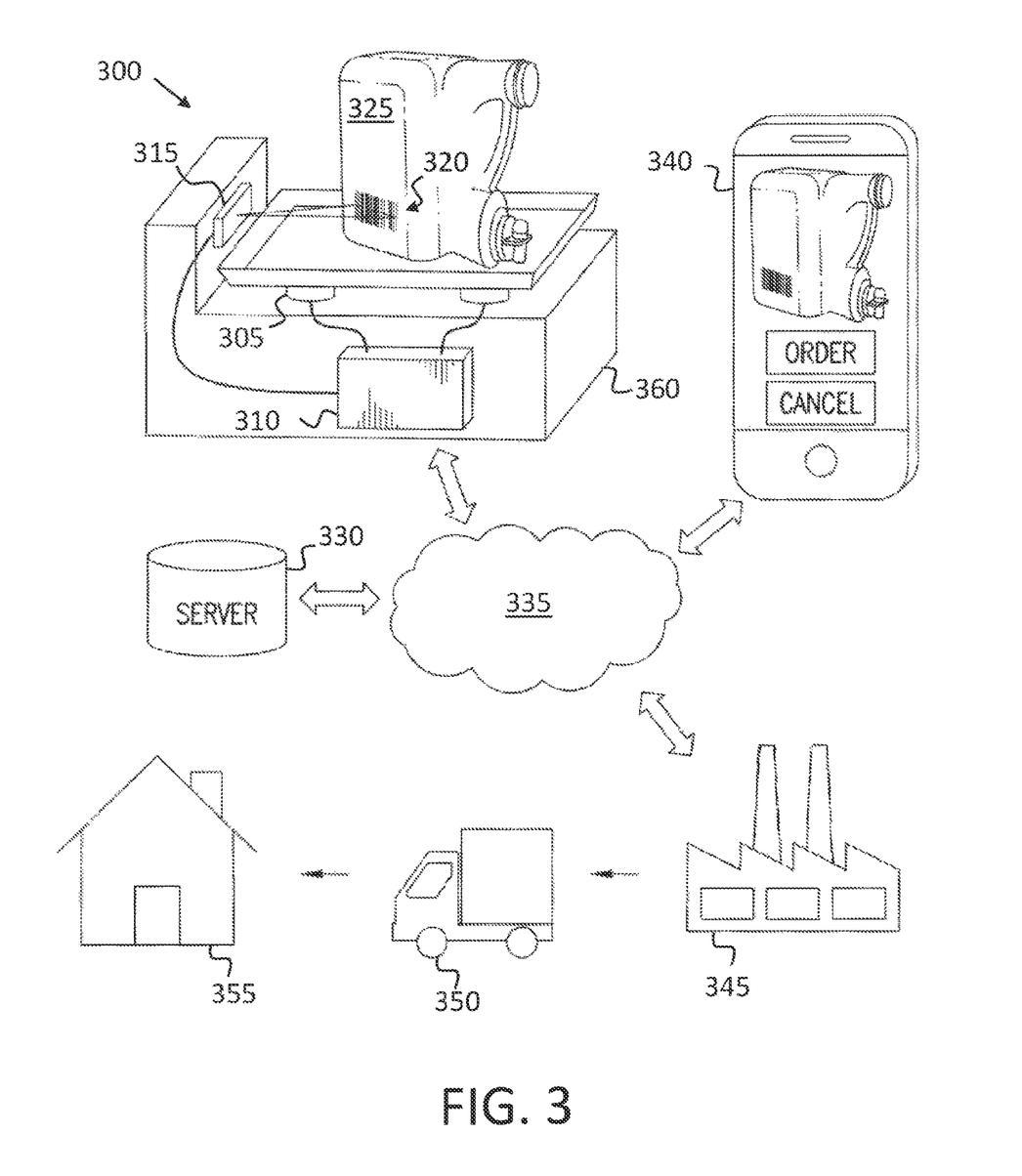
FIG. 3 depicts an exemplary network-connected scale with an integrated machine-readable code scanner.

FIG. 3 depicts an exemplary network-connected scale with an integrated machine-readable code scanner. A network-connected scale 300 includes a load cell 305. The load cell 305 is operatively coupled to a processor 310. The processor 310 is operatively coupled to an integrated machine-readable code scanner 315. The integrated machine-readable code scanner 315 may scan a barcode 320 on a product container 325 in response to the product container 325 being placed on the network-connected scale 300. The integrated machine-readable code scanner 315 may capture product identifying information associated with a product container. The product container 325 may contain the product.

A dynamic weight of the product in the product container 325 is continuously monitored by the processor 310. In an illustrative example, as product from the product container 325 (e.g., laundry detergent) is dispensed, the overall weight of the product in the product container 325 decreases. In response to the weight of the product in the product container 325 falling below a predetermined threshold, the processor 310 sends a reordering signal to a server 330 via a network 335. Accordingly, the server 330 sends an alert signal a user's computing device 340 (e.g., mobile phone, tablet, laptop computer, desktop computer).

The user's computing device 340 displays the alert coupled with a query for user action. For example, the alert may depict the product container 325 sitting on the network-connected scale 300. The alert may illustrate the reached threshold that triggered the alert. The query coupled with the alert may display one or more user choices. For example, the user may be allowed to cancel the alert, ignore the alert, request a reminder at a later time, or to reorder the product.

In response to a user choice of reordering the product in the product container 325, the user's computing device 340 sends a purchase request signal to a vendor 345. The vendor 345 processes the purchase request, and initiates a shipment 350. A delivery address 355 receives the shipment 350.

The network-connected scale 300 includes an enclosure 360. The enclosure 360 contains the processor 310. The processor 310 is operatively coupled to the integrated machine-readable code scanner 315. The integrated machine-readable code scanner 315 is integrally formed in the enclosure 360. In various examples, the integrated machine-readable code scanner 315 integrally formed in the enclosure 360 with the processor 310 may advantageously provide automatic scanning of the barcode 320.

Figure 4:
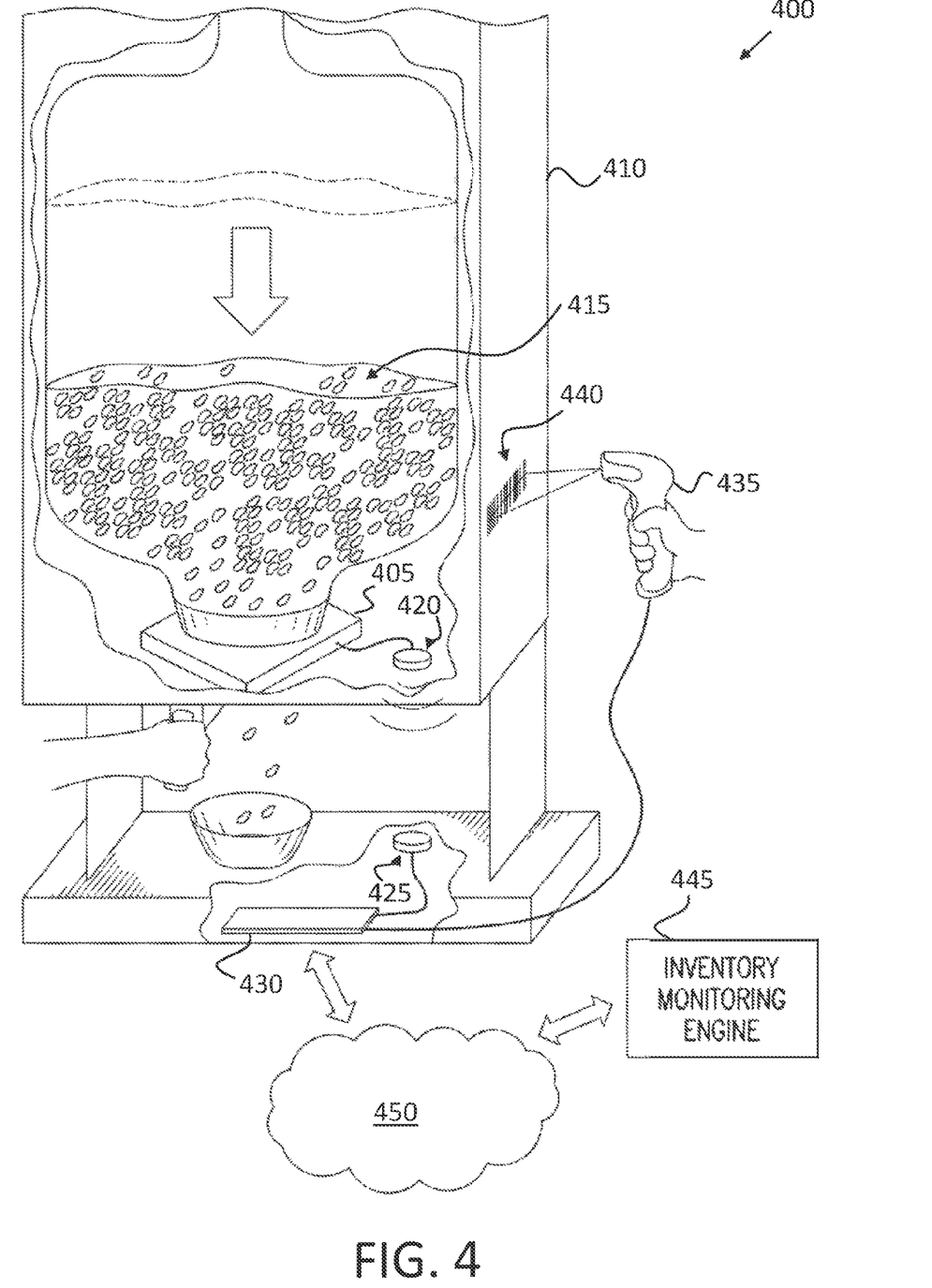
FIG. 4 depicts an exemplary network-connected scale integrated into the packaging of a product.

FIG. 4 depicts an exemplary network-connected scale integrated into the packaging of a product. A network-connected weigh scale 400 includes a load cell 405. The load cell 405 is incorporated within a product package 410. The product package 410 includes a consumable product 415. In the depicted example, the consumable product 415 is dry oatmeal. In various examples, the consumable product 415 may be a fluid-like product (e.g., dry raw foods such as rice or beans, sauces or condiments, drinks, baking ingredients, spices, coffee accoutrements, hand sanitizer, paint). The load cell 405 is operatively coupled to a transmitter 420. The transmitter 420 sends a signal containing the weight of the consumable product 415 from the load cell 405 to a receiver 425. Accordingly, the transmitter 420 is in wireless communication with the receiver 425. The receiver 425 sends a signal containing the weight of the consumable product 415 to a processor board 430. The processor board 430 receives a barcode signal from a machine-readable code scanner 435. The machine-readable code scanner 435 generates the barcode signal containing a barcode value from a barcode 440. The machine-readable code scanner 435 may capture product identifying information associated with a product container. The product container may contain the consumable product 415.

A dynamic weight of the consumable product 415 may be continuously monitored by the processor board 430. In the depicted example, as the consumable product 415 (e.g., oatmeal) is dispensed, the overall weight of the consumable product 415 within the product package 410 decreases. In response to the weight of the consumable product 415 falling below a predetermined threshold, the processor board 430 sends a reordering signal to an inventory monitoring engine 445 via a network 450.

Figure 5:
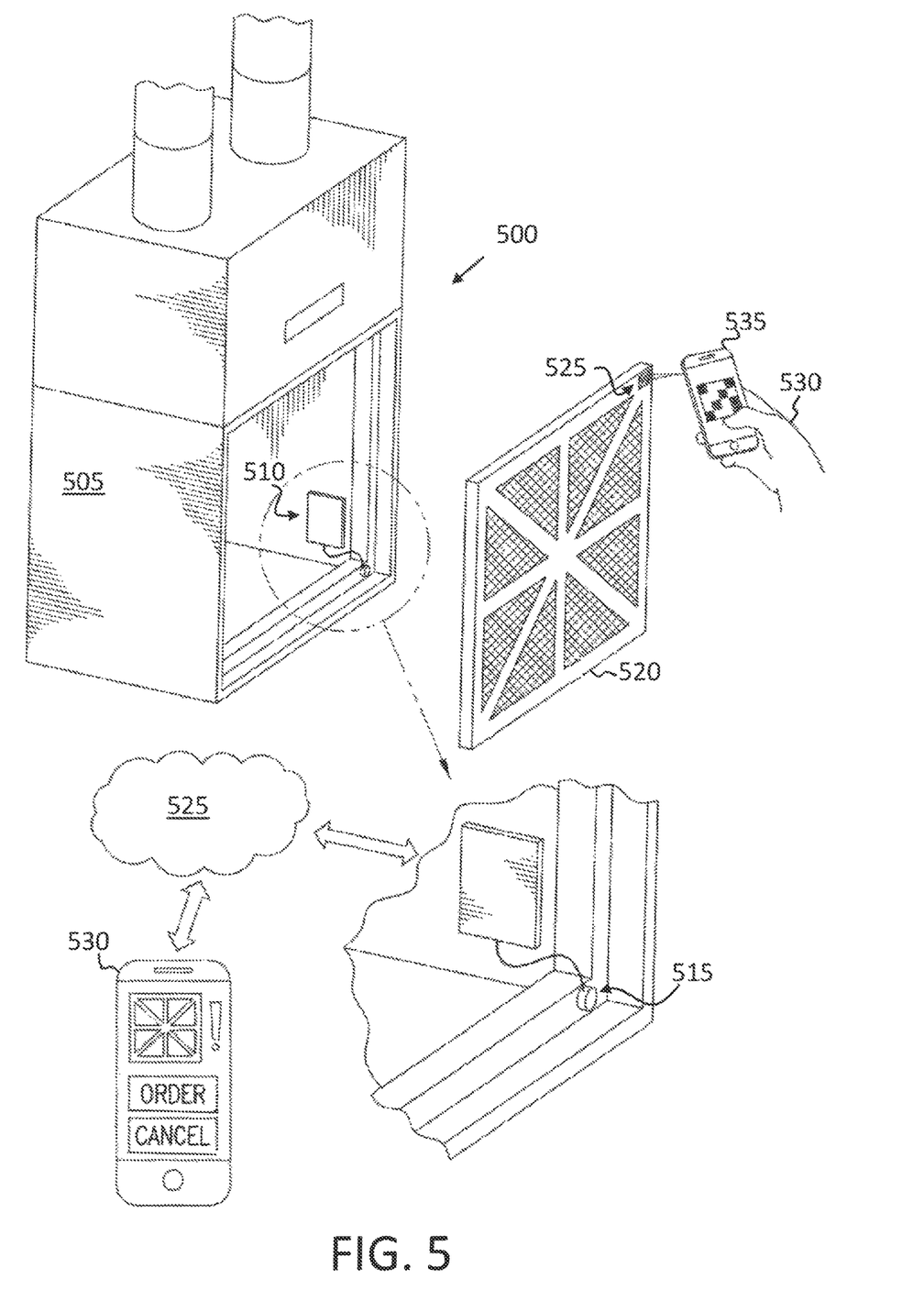
FIG. 5 depicts an exemplary network-connected force sensor circuit, the circuit continuously monitoring a force indicative of product end-of-useful-life to trigger a reorder event in response to the force exceeding a predetermined force threshold.

FIG. 5 depicts an exemplary network-connected force sensor circuit, the circuit continuously monitoring a force indicative of product end-of-useful-life to trigger a reorder event in response to the force exceeding a predetermined force threshold. A furnace filtration system 500 includes a furnace 505. The furnace 505 includes a network-connected force sensor subsystem 510. The network-connected force sensor subsystem 510 includes a force sensor 515. In various examples, the network-connected force sensor subsystem 510 may include one or more force sensors 515. An air filter 520 is releasably coupled to the furnace 505. The air filter 520 includes a machine-readable code 525. A user 530 scans the machine-readable code 525 with a machine-readable code scanner 535. The machine-readable code scanner 535 may capture product identifying information associated with a product container. The product container may contain the air filter 520.

In an illustrative example, the machine-readable code scanner 535 sends a signal containing the product identifying information coded on the machine-readable code 525 to the network-connected force sensor subsystem 510. The force sensor subsystem 510 may send an electronic request message to a product information database to access information associated with the air filter 520. The force sensor subsystem 510 may retrieve, from the product information database, nominal force information associated with the air filter 520 prior to use of the air filter 520. In some examples, the machine-readable code 525 may be a quick response (QR) code.

In some examples, the furnace filtration system 500 may record an initial baseline force measurement during operation of the air system (e.g., while forced air flow is on). The initial baseline force measurement may be stored in a data store device (e.g., random access memory (RAM)) as a nominal force measured value. The measured nominal force of a newly installed air filter, such as air filter 520, may be captured and compared with a manufacturer supply range of nominal force, for example, associated with the identified product information, to verify proper installation of the air filter 520.

In an illustrative example, the initial baseline force measurement may be subtracted from a continuous force measurement to produce a continuous relative force measurement. When the relative force measurement crosses a predetermined threshold, a repurchase signal may be triggered. The relative force measurement may advantageously provide application flexibility, since the baseline force measured may vary based on the individual heating ventilation and air conditioning (HVAC) implementation at each particular installation site. The baseline force measurements may differ, for example, due to air flow variability from furnace to furnace, and air resistance variability from filter to filter. In some embodiments, the force sensor 515 may measure an increase in weight of the air filter 520 over time-of-use.

In some embodiments, an HVAC system may include a force sensor, such as force sensor 515. The force sensor may send measurement signals to a processor. When a replaceable air filter, such as air filter 520, is installed into the HVAC system, the replaceable air filter becomes proximate to the force sensor. The force sensor may be configured to measure the weight of the replaceable air filter. In some examples, the force sensor may be configured to measure a force indicative of the air resistance of the replaceable air filter, when the HVAC system is in operation forcing air through the system. As the replaceable air filter is filled with particulate matter, the force sensor may sense the additional weight or sense the additional air resistance. The processor may determine that the measurement signal from the force sensor crosses a predetermined threshold. Accordingly, the processor may generate a replacement signal in response to the measurement crossing the predetermined threshold.

In the depicted example, the air filter 520 sits against the force sensor 515. In operation, as a fan within the furnace 505 draws in ambient air, the air filter 520 applies a force to the force sensor 515. The force applied to the force sensor 515 may be a function of the amount of particulate matter captured in the air filter 520. Accordingly, as the air filter 520 is filled with particulate matter, and nears the end of its useful life, a signal from the force sensor 515 may change. The network-connected force sensor subsystem 510 may send an alert signal to a network 540 in response to the signal from the force sensor 515 crossing a predetermined threshold. A remote device 545 is connected to the network 540. The remote device 545 receives the alert signal from the network-connected force sensor subsystem 510. In various examples, the machine-readable scanner 535 may be the remote device 545.

In various examples, the level of contents of the air filter 520 increases as the filter collects, for example, dust and debris. In some examples, such as the increasing level of contents in the air filter 520, nominal force may be a baseline pressure determined from measurement upon initial installation or initial use. In an illustrative example, a maintenance person may be executing a work order to replace an air filter (e.g., 520) in a facility air handling unit. The maintenance person may cut power to the air handling unit, which may signal a force sensor subsystem (e.g., 510) that the filter is being replaced. Once the maintenance person replaces the filter and switches power back on, the force sensor subsystem (e.g., 510) may take a new force measurement as a baseline pressure, and may store the measurement as the nominal force.

Figure 6:
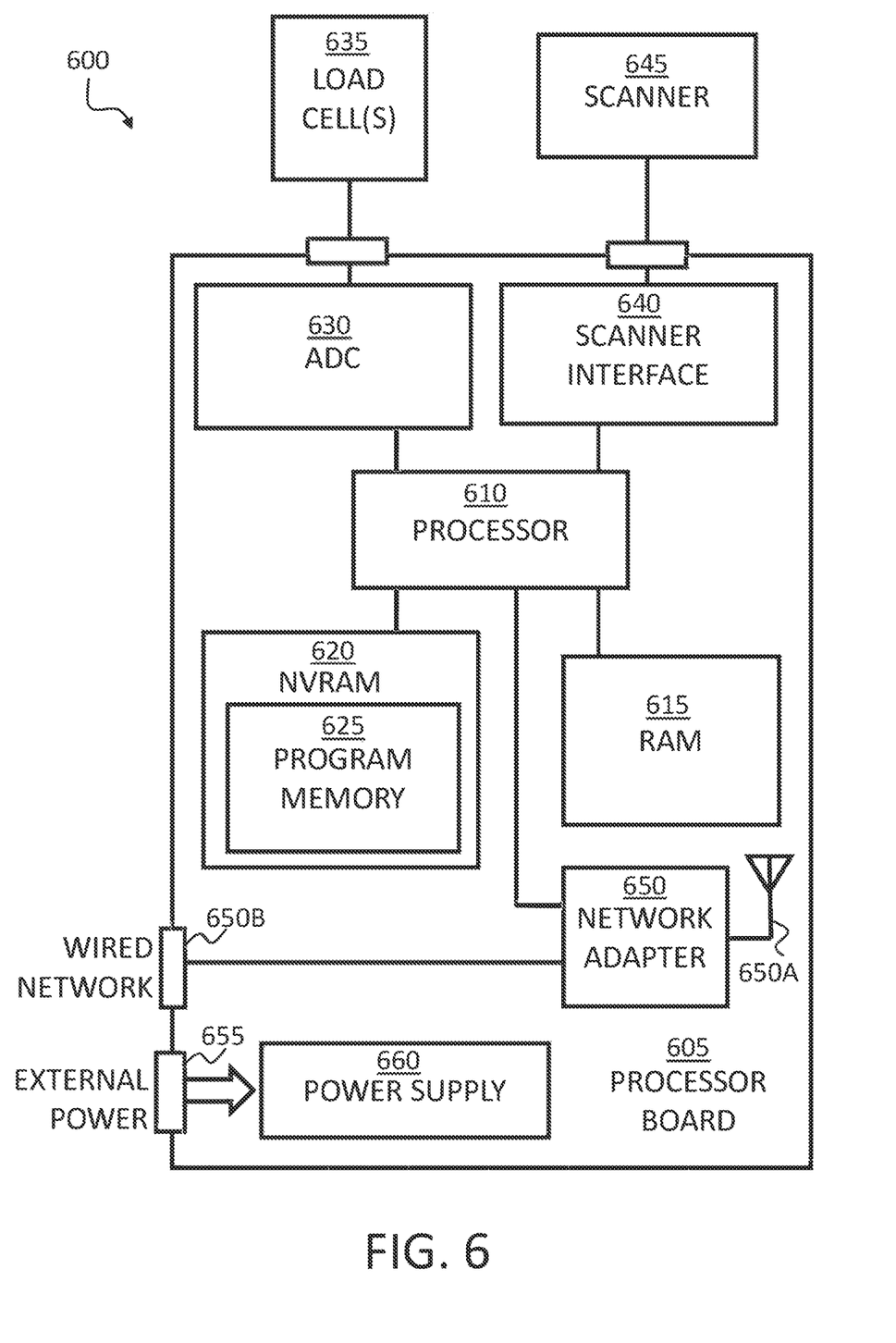
FIG. 6 depicts a block diagram of an exemplary network-connected scale.

FIG. 6 depicts a block diagram of an exemplary network-connected scale. A network-connected scale 600 includes a processor board 605. The processor board 605 includes a processor 610. In some embodiments, the processor 610 may be a central processing unit (CPU), which may be implemented, for example, in the processors 110, 210, 310, or in the processor board 430, as described with reference to the exemplary embodiments of FIGS. 1-4. In some embodiments, the processor 610 may be a microcontroller. The processor 610 is operably coupled to a random-access memory (RAM) 615. The RAM 615 facilitates basic operation of the processor 610 by providing general memory access. The processor 610 is operably coupled to a non-volatile random-access memory (NVRAM) 620. The NVRAM 620 includes a program memory 625. The NVRAM 620 provides memory locations for various constants that facilitate basic execution of the processor 610.

More specifically, a portion of the NVRAM 620 includes the program memory 625 which contains the preprogrammed instructions that the processor 610 executes. The processor 610 is operably coupled to an analog to digital converter (ADC) 630. The ADC 630 provides the analog-to-digital conversion to facilitate processor access to one or more load cells 635. The load cells 635 send a signal to the ADC 630 indicative of a product weight, such as the product 130 in FIG. 1. The processor 610 is operably coupled to a scanner interface 640. The scanner interface 640 provides the circuitry to facilitate processor access to a scanner 645, such as the image scanner 115 in FIG. 1. The scanner 645 may capture product identifying information associated with a product container.

The processor 610 is operably coupled to a network adapter 650. The network adapter 650 provides the circuitry to facilitate network access. In some embodiments, the network adapter 650 may provide wireless network access 650A. In some examples, the network adapter 650 may provide wired network access 650B. In the depicted example, the network adapter 650 provides both wireless network access 650A and wired network access 650B. The processor board 605 receives external power 655. The external power 655 supplies a power supply module 660. The power supply module 660 supplies power to all circuits on the processor board 605. The power supply module 660 may supply power to the load cells 635 and/or the scanner 645.

Figure 7:
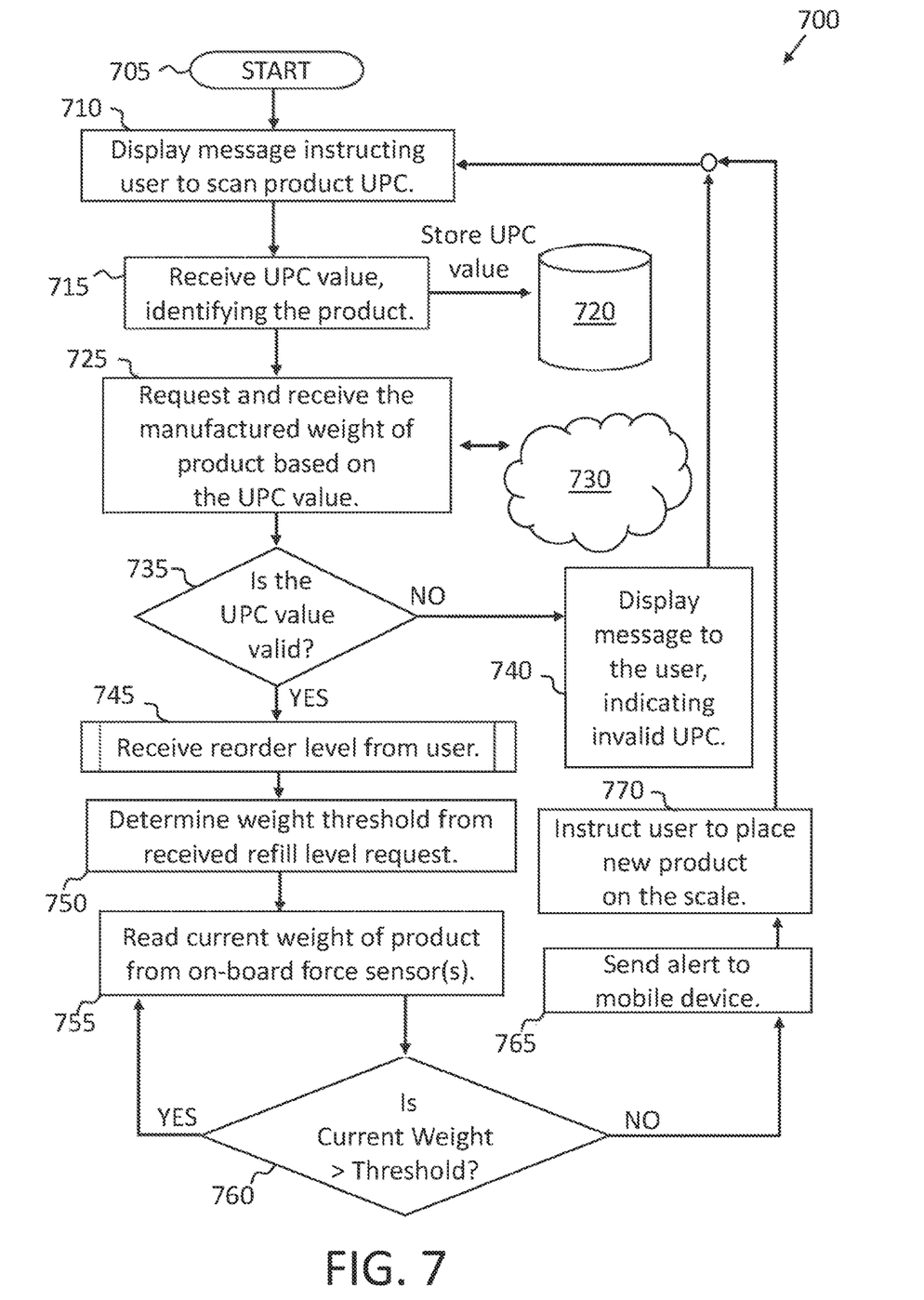
FIG. 7 depicts a flowchart of a universal product code (UPC) identification and continuous weight monitoring process of an exemplary network-connected scale.

FIG. 7 depicts a flowchart of a universal product code (UPC) identification and continuous weight monitoring process of an exemplary network-connected scale. A UPC gathering and weight monitoring module 700 includes a starting point 705 that may be executed, for example, by the processor 610 described with reference to FIG. 6 and/or program memory 625. Module execution from the starting point 705 displays a message instructing a user to scan the product UPC, at step 710. Next, at step 715, the received UPC value is stored to memory 720. Next, at step 725, the module 700 makes a request via a network 730 for the manufactured weight of the product associated with the UPC value. The manufactured weight may represent a nominal force. In various embodiments, the module 700 may make a request via the network 730 for associated product parameters (e.g., manufacturing weight, product name, manufacturer, size options, lead time, stocking status, alternate vendors, packaging options). In step 725, a signal from the network 730 containing one or more of the associated product parameters is received.

At step 735, the module 700 validates the UPC value. If the UPC value is invalid, then a message is displayed to the user indicating that the UPC value was invalid, at step 740. Execution then jumps back to step 710.

If at step 735 the UPC value is valid, then a submodule 745 executes to receive the reorder level the user. Submodule 745 is further explained in FIG. 8. Next, at step 750, the module 700 determines a weight threshold from the receive refill level request from submodule 745. For example, submodule 745 may return a value of "25%." In response, step 750 may multiply the refill value by the manufactured weight received at step 725, the result determining a weight threshold.

Next at step 755, the module 700 reads a current weight of the product on a network-connected scale. The scale may include one or more force sensors. If the current weight exceeds the threshold determined at step 750, execution jumps back to step 755 where the product is weighed again. Execution continues to loop between step 755 and 760 while the current weight exceeds the threshold determined at step 750.

Figure 9:
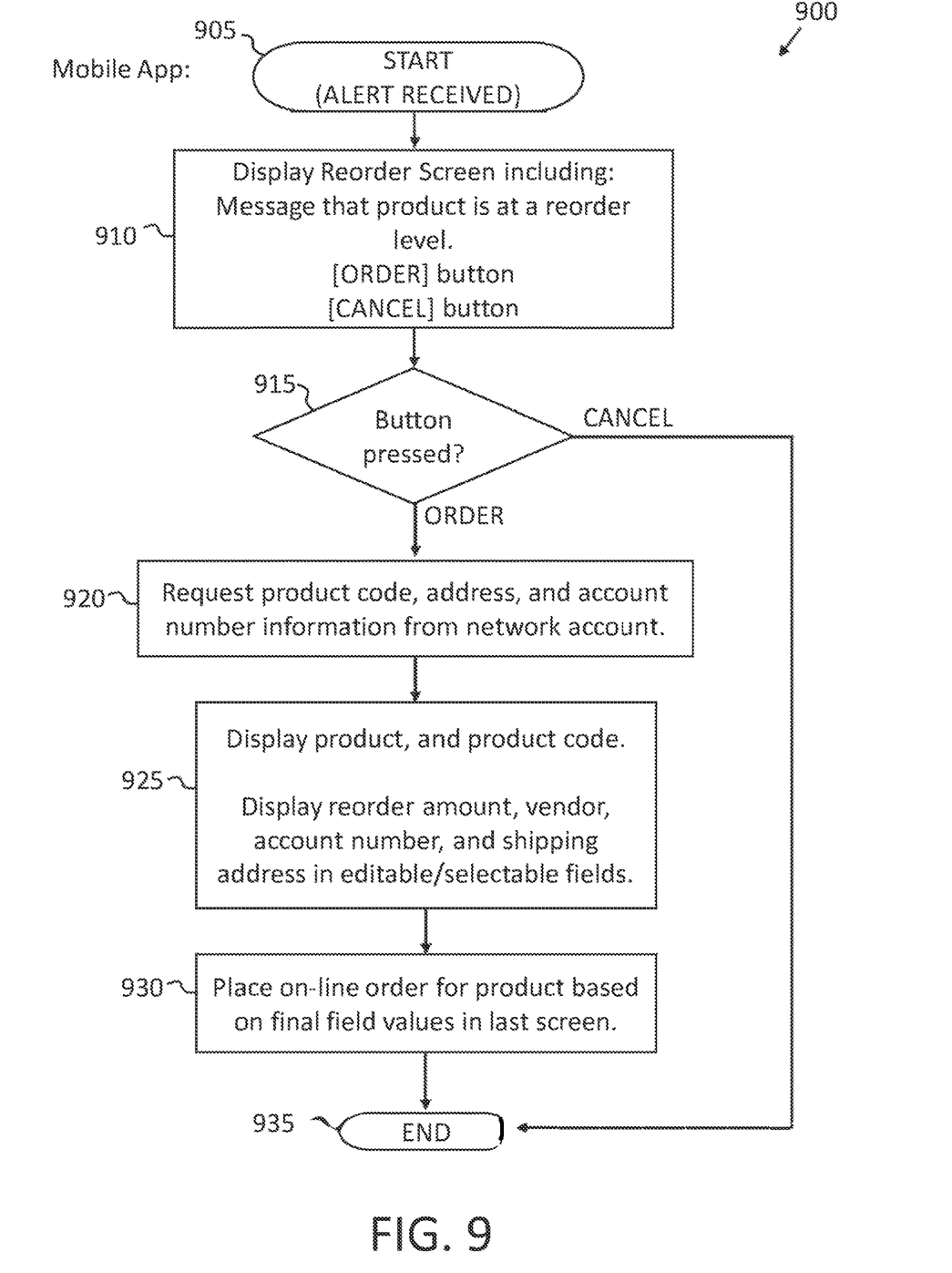
FIG. 9 depicts a flowchart of an exemplary mobile application illustrating a reorder query process.

If at step 760 the current weight drops below the threshold determined in step 750, the module 700 sends an alert to a designated mobile device at step 765. FIG. 9 describes an exemplary application module that processes the alert to the designated mobile device. Returning now to FIG. 7, module 700 instructs the user to place a new product (e.g., full bag) onto the network-connected scale at step 770. Execution then jumps back to step 710, where the process repeats.

Figure 8:
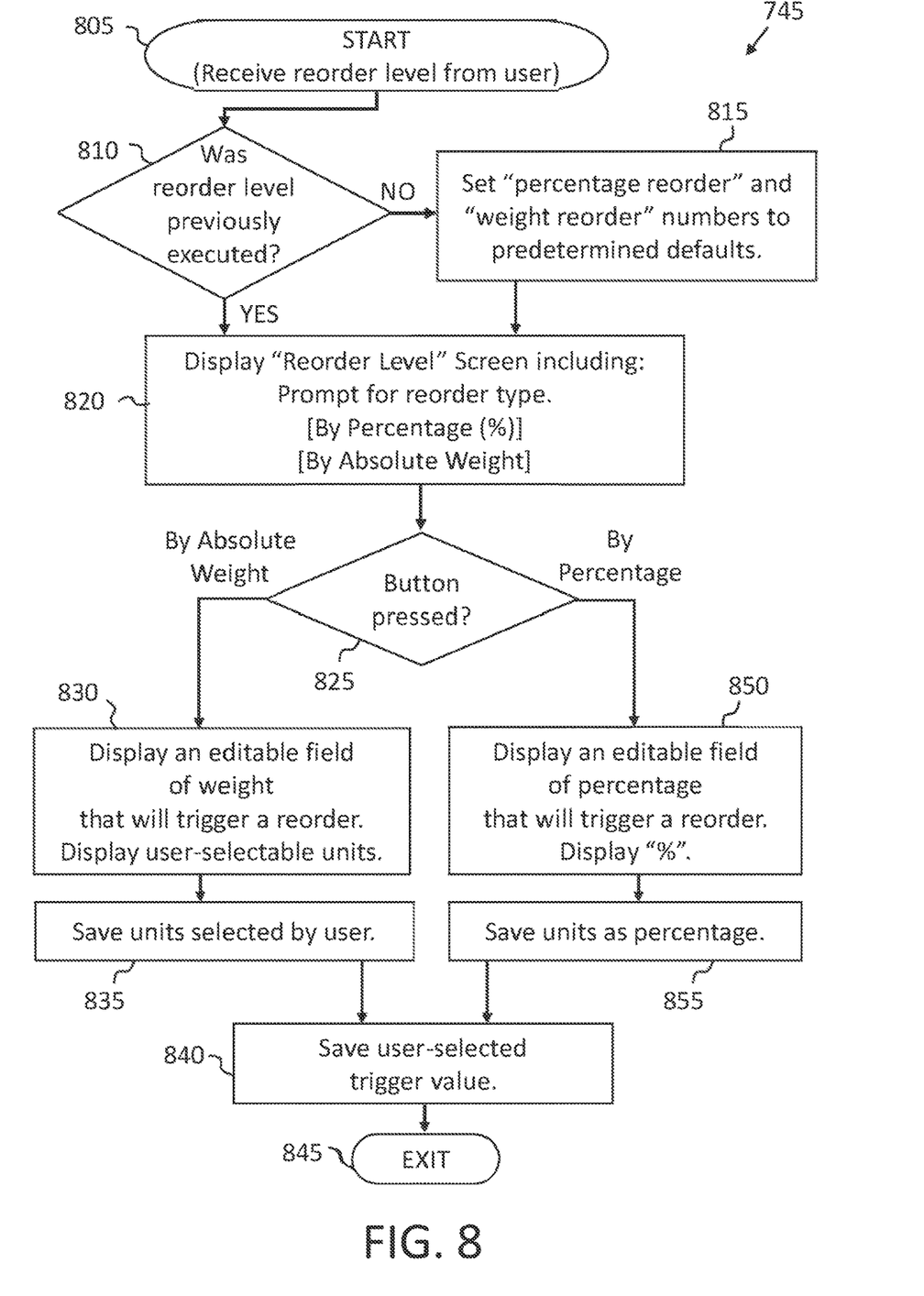
FIG. 8 depicts a flowchart of an exemplary mobile application illustrating a reorder level process.

FIG. 8 depicts a flowchart of an exemplary mobile application illustrating a reorder level process. A refill level request submodule 745 includes a starting point 805. Submodule 745 executes from the starting point 805. Next, at step 810 submodule 745 checks if the submodule 745 was previously executed. If the submodule 745 was previously executed, then execution jumps to step 815. At step 815 predetermined defaults are populated into the percentage reorder variable and the weight reorder variable. Execution then continues to step 820. If the submodule 745 was previously executed, then execution jumps directly to step 820, which keeps the previously saved values for percentage reorder and weight reorder.

Execution continues with step 820 where the submodule 745 displays a reorder level screen. The reorder level screen includes a prompt for the reorder type. The user selects one of two types. At step 825, the submodule 745 determines which button was selected by the user.

If "absolute weight" is selected, then execution jumps to step 830, where the submodule 745 displays an editable field. The editable field contains a reorder weight trigger value that may be adjusted by the user at this step. The reorder weight may represent a snapshot of a product's dynamic weight as it is being consumed that triggers a reorder event when reached. At step 830, the display includes user selectable weight units that may be selected by the user. Once the user selects the trigger value and the units, the submodule 745 saves the units selected, at step 835. The module 745 then saves the trigger value at step 840. The module 745 is then exited at step 845.

If at step 825 "percentage" is selected, then execution jumps to step 850, where the submodule 745 displays an editable field. The editable field contains a reorder percentage trigger value that may be adjusted by the user at this step. The percentage may represent the percentage of a product's manufactured weight that triggers a reorder event when reached. At step 850, the display includes a percentage sign to indicate that the user is adjusting a percentage value. Once the user selects the trigger value, the module 745 saves the units as percentage at step 855. The module 745 then saves the trigger value at step 840. The module 745 is then exited at step 845.

In various implementations, adjustments to the reorder levels may be presented graphically. For example, the reorder level may be a graphical slide. The graphical slide may facilitate user entry of the reorder level, avoiding discrete number entry. Further, the reorder level may be a graphical knob. In some examples, the reorder level may be a list of user-selectable preset levels.

FIG. 9 depicts a flowchart of an exemplary mobile application illustrating a reorder query process. An exemplary mobile application 900 is initiated at step 905 where an alert is received from an exemplary network-connected weigh scale, such as the network-connected weigh scale 200 in FIG. 2. When the mobile application 900 receives a signal from a network containing an alert message, the mobile application 900 executes step 910. At step 910 the mobile application 900 displays a reorder screen, for example, as depicted on the user's computing device 145 in FIG. 1. The reorder screen in this example includes an order button and a cancel button. The mobile application 900 makes a button selection determination at step 915.

If the cancel button is selected, the mobile application 900 exits at step 935. If the order button is selected, the mobile application 900 begins execution of a product reordering process beginning at step 920 where the mobile application 900 makes a network connection with a user account. The mobile application 900 requests information from the user account, such as product code, user account number and user shipping address. At step 925, the mobile application 900 makes a network connection with a user merchant account. In various examples, the user account and the user merchant account may be the same account. In the depicted example, in step 925, the mobile application 900 displays an image of the product along with the product code. The mobile application 900 also displays in step 925, a reorder amount (e.g., bag size), a vendor account number and a shipping address. In some examples, the displayed values may be editable. Editable fields may advantageously allow the user to adjust the order from the product scanned data in a previous step. For example, the user may decide to get a larger container of laundry detergent, or may change shipping address. Finally, in step 930 the mobile application 900 places an online order for the product based on the final displayed values. The mobile application 900 is then exited at step 935.

Although various embodiments have been described with reference to the figures, other embodiments are possible. For example, a network-connected scale may receive a signal which includes a suggested reorder weight. The suggested reorder weight may be based, for example, on the number of pets, types of pets and/or breeds that a user feeds. The suggested reorder weight may become a predetermined reorder threshold. This exemplary information may be part of a set-up module executing predetermined steps on a processor. The processor may be located on the network-connected scale and/or as part of an application (app) on a mobile device (e.g., smart phone, tablet, laptop computer, desktop computer), and/or located on a network-connected server. The set-up module may query the user for information, which may be used by various applications to aid the user with purchasing choices, for example. Further, the set-up module may query a user for the pet's ages, allergies, and/or dietary restrictions, for example. In some implementations, a pet's name or ID number may be entered into the system to provide a convenient method to organize multiple purchases, for example, in a dog kennel setting, or at a private owner's home with multiple pets. Various embodiments may order one or more products at a time.

In some embodiments where the product is depleted as it is used, the predetermined threshold may be about 50%, 40%, 30%, 25%, 20%, 10% or less than about 5%. In some embodiments where the product fills up as it is used (e.g., filters), the predetermine threshold may be about 50%, 60%, 70%, 75%, 80%, 90% or greater than about 95%. In some embodiments, the predetermined threshold may be an absolute weight or an absolute force. In various implementations, the predetermined threshold may be reorder weight, a reorder force or a reorder percentage. In some examples, a network-connected scale may learn and automatically adjust a predetermined threshold. The learned predetermined threshold may be based on historical user selections, for example.

In various implementations, network-connected merchants and/or online merchants may manage information, of users of network-connected scales, in online databases and/or accounts. Merchants may find advantage in managing such customers' online information. Customers may conveniently purchase products from such merchants hosting the online accounts.

In various embodiments, a network-connected scale may assume the full weight of a product when a user indicates the full weight is currently on the scale. For example, a user may prefer the convenience of using a personal container to hold ground coffee. The user may fill the personal container with ground coffee, place it on the network-connected scale, then indicate to the scale that the product container (e.g., the coffee) is full. This indication of "full product" may be a button electrically coupled to a processor within the network-connected scale, or may be a button on a display screen during a machine-readable code reading process, such as step 710 in FIG. 7. In such embodiments, the user may employ the network-connected scale without the automated product look-up functions.

In some embodiments, the network-connected scale may include demand forecasting. Online vendors and/or manufacturers may benefit by accelerating production of those items forecasted for higher demand. As such, product manufacturers may anticipate the needs of their customers.

Various embodiments may implement debounce filters within executable preprogrammed instructions. For example, as a user scoops cat food out of a bag, a network-connected scale may detect rapid product weight variations as the user presses a hand-shovel into the food. Rapid force variations may be filtered with various methods. For example, some methods may ignore variations occurring within a limited period of time. In some examples, the weight of the product may be averaged over a substantially long period of time. A substantially long period, in this example, may be on the order of tens of seconds. Further, in some implementations, hysteresis filters may be employed. For example, once a threshold has been crossed, the network-connected scale may trigger a reorder process, masking further weight measurement decisions until the scale values cross a second threshold in an opposite direction.

In some examples, the network-connected scale may accept products conforming to specific dimensions and/or products including specific mechanical features. As popularity of the network-connected scale increases among the general consumer population, product manufacturers may increase sales by conforming to the specific dimensions and specific mechanical features. Accordingly, product manufacturers may conform to these specific dimensions and features as business cases dictate. Further, consumers may reorder from conforming merchants based on the packaging compatibility with their network-connected scale.

In an illustrative example, a network-connected scale may be employed on a pallet carried by a forklift. The network-connected scale may send a signal containing an alert message to a server on the network when a rapid decrease of weight is detected. The rapid decrease of weight may be indicative of an item falling off from the pallet. Various warehousing businesses may find benefit in the network-connected scale in detection of lost items, avoidance of accidents, and/or damage of inventory, for example. In some implementations, the scale may not be network-connected. In some implementations, the scale may send the alert signal directly to the driver via a wired connection or via a wireless connection (e.g., radio frequency (RF), acoustical, optical).

In some embodiments, the machine-readable code scanner may scan a product identifier via Radio-Frequency (RF). For example, the product identifier may be coded as a Radio-Frequency Identification (RFID) tag. Further, the RF identifier may employ Near-Field Communication (NFC). Various examples of machine-readable code scanners may employ physical contact such as identifying bumps or apertures. Some examples of machine-readable code scanners may employ optics, for example, the scanners may employ character recognition, printed bar-width differentiation. Some examples of machine-readable code scanners may employ decoding of identifiers encoded with dots or squares, for example, in an encoded pattern. Some scanner implementations may read encoding using reflection versus dispersion with scanning light, for example. Some scanner implementations may read magnetic encoding.

Some aspects of embodiments may be implemented as a computer system. For example, various implementations may include digital and/or analog circuitry, computer hardware, firmware, software, or combinations thereof. Apparatus elements can be implemented in a computer program product tangibly embodied a in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from a source to a first receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, FireWire, ATA/IDE, RS-232, RS-422, RS-485, 802.11 a/b/g/n, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, a computer system may include non-transitory memory. The memory may be connected to the one or more processors may be configured for encoding data and computer readable instructions, including processor executable program instructions. The data and computer readable instructions may be accessible to the one or more processors. The processor executable program instructions, when executed by the one or more processors, may cause the one or more processors to perform various operations.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A method for automatic ordering, the method comprising:
    capturing, via a machine-readable code scanner (MRCS), product identifying information associated with a product container;
    outputting, via a force sensor, a force signal representative of a level of contents within the product container;
    receiving, via a processor from the MRCS, the product identifying information for the product container;
    validating, via the processor, the product identifying information;
    sending, via the processor, an electronic request message to a product information database to access force information associated with the product identifying information, wherein the electronic request message is sent based on the validation of the product identifying information;
    receiving, via the processor from the force sensor, the force signal representative of a current level of contents within the product container;
    retrieving, via the processor, a predetermined threshold for the level of contents within the product container;
    comparing, via the processor, the current level of contents in the product container to the predetermined threshold for the level of contents within the product container; and
    generating, via the processor, a reorder signal when the force signal indicates a higher level of contents in the product container than the predetermined threshold.

2. The method of claim 1, further comprising capturing, via the MRCS, product identifying information from the product container while the force sensor outputs the force signal representative of the current level of contents within the product container.

3. The method of claim 1, further comprising retrieving, via the processor from the product information database, nominal force information associated with the product container prior to use of the product, wherein the nominal force information indicates a pressure associated with a fluid flow through the product container.

4. The method of claim 3, wherein the product information database is accessed by the processor by communicating with a computing device.

5. The method of claim 4, wherein the product information database resides on the computing device.

6. The method of claim 4, wherein the computing device retrieves, via a wide area network connection, the nominal force information from the product information database located in a storage device remote from the computing device.

7. The method of claim 1, further comprising transmitting an electronic message of the reorder signal for display, on a display device, in a human-readable representation in combination with a user input control requesting user input to approve the reorder signal for external communication.

* * * * *